US006921029B2

(12) United States Patent
Lockwood

(10) Patent No.: US 6,921,029 B2
(45) Date of Patent: Jul. 26, 2005

(54) METHOD AND APPARATUS FOR REDUCING THE PRECIPITATION RATE OF AN IRRIGATION SPRINKLER

(75) Inventor: George H. Lockwood, Pompano Beach, FL (US)

(73) Assignee: Rain Bird Corporation, Glendora, CA (US)

( * ) Notice: Subject to any disclaimer, the term of this patent is extended or adjusted under 35 U.S.C. 154(b) by 164 days.

(21) Appl. No.: 10/295,689

(22) Filed: Nov. 14, 2002

(65) Prior Publication Data

US 2003/0098365 A1 May 29, 2003

Related U.S. Application Data

(60) Provisional application No. 60/360,883, filed on Mar. 4, 2002, provisional application No. 60/360,420, filed on Mar. 1, 2002, provisional application No. 60/344,398, filed on Jan. 3, 2002, and provisional application No. 60/348,488, filed on Nov. 28, 2001.

(51) Int. Cl.[7] .......................... A01G 25/06; B05B 15/10

(52) U.S. Cl. ....................... 239/203; 239/200; 239/201; 239/204; 239/205; 239/206

(58) Field of Search ................................ 239/203, 200, 239/201, 204, 205, 206, 569, 574, 571, DIG. 1

(56) References Cited

U.S. PATENT DOCUMENTS 4,502,631 A 3/1985 Christen
4,781,217 A 11/1988 Rosenberg
4,892,252 A * 1/1990 Bruninga .................... 239/205
5,009,368 A 4/1991 Streck et al.
5,086,977 A * 2/1992 Kah, Jr. ...................... 239/205
5,199,646 A * 4/1993 Kah, Jr. ...................... 239/240
5,267,690 A 12/1993 Gazzoni
5,314,116 A 5/1994 Krauth et al.
5,465,752 A * 11/1995 Higgins .................. 137/512.5
5,642,861 A 7/1997 Ogi et al.
5,762,270 A 6/1998 Kearby et al.
5,794,849 A 8/1998 Elder
5,803,365 A 9/1998 Ruttenberg
5,820,029 A 10/1998 Marans
5,918,812 A 7/1999 Beutler
5,975,430 A 11/1999 Larsen
6,026,851 A 2/2000 Rosenberg
6,050,502 A * 4/2000 Clark ......................... 239/237
6,237,862 B1 * 5/2001 Kah et al. ................... 239/391
6,244,521 B1 * 6/2001 Sesser ................... 239/222.17
6,264,117 B1 * 7/2001 Roman ....................... 239/203
6,286,765 B1 9/2001 Byles
6,691,739 B2 2/2004 Rosenberg
2002/0030066 A1 3/2002 McKenna
2002/0088878 A1 7/2002 Sirkin
2002/0179734 A1 12/2002 Clark
2003/0213856 A1 11/2003 Sirkin

OTHER PUBLICATIONS

Rain Bird Product Literature entitled "Landscape Irrigation Products 2001–2002 Catalog" (2 pages).

* cited by examiner

*Primary Examiner*—Davis Hwu
(74) *Attorney, Agent, or Firm*—Fitch, Even, Tabin & Flannery

(57) ABSTRACT

A method and apparatus for reducing the effective precipitation rate of an irrigation sprinkler during an irrigation cycle without disrupting the supply of pressurized water from the source opening and closing the inlet to the sprinkler riser at timed intervals through the use of a flow stop valve assembly disposed at the base of the riser, and which includes a lost motion piston and cylinder assembly and first and second flow control devices which control the time the flow stop valve is in the open and closed conditions during the irrigation cycle.

42 Claims, 9 Drawing Sheets

METHOD AND APPARATUS FOR REDUCING THE PRECIPITATION RATE OF AN IRRIGATION SPRINKLER

CROSS REFERENCE TO RELATED APPLICATIONS

This application relates to my prior filed Provisional Application No. 60/348,488 filed Nov. 28, 2001; Provisional Application No. 60/344,398 filed Jan. 3, 2002; Provisional Application No. 60/360,420 filed Mar. 1, 2002; and Provisional Application No. 60/360,883 filed Mar. 4, 2002 from which priority is claimed.

FIELD OF THE INVENTION

This invention relates to irrigation sprinklers, and more particularly to a new and improved method and apparatus for reducing the effective precipitation rate of a fixed spray type sprinkler, particularly of the pop-up type.

BACKGROUND OF THE INVENTION

Probably the most common method of irrigating landscape areas of vegetation is by the use of sprinklers. In a typical irrigation system various types of sprinklers are used to distribute water over a desired area. In general, sprinkler devices are divided into two types, namely rotating stream type and fixed spray pattern type. The stream type sprinkler, commonly referred to as a rotor, trajects a stream of water outwardly from a nozzle, which is rotating slowly over a predetermined arc or complete circle. The spray type sprinkler sprays water from a stationary nozzle, the pattern of coverage being determined by the geometric shape of the discharge passage of the nozzle.

For reasons well known to those involved in the design of irrigation systems, the precipitation rate of the rotor type sprinklers is much lower than the precipitation rate of the fixed nozzle type sprinkler. For proper irrigation of plant life and conservation of water it is extremely important to have a uniform or prescribed amount of water delivered by the irrigation system to a specific area. Because of the difference in precipitation rates of the two types of sprinklers, heretofore it has been necessary to operate the rotor type of sprinkler for a longer time than the spray type sprinkler. In order to accomplish this, it has been necessary to have the two types of sprinklers operated separately whereby each type could be operated for a suitable time to supply the desired total precipitation to the irrigated area. Prior to this invention many attempts have been made to reduce the precipitation rates of spray type sprinklers. Most, if not all of such attempts have been concentrated on the design of the nozzles in order to reduce the rate of flow of water.

SUMMARY OF THE INVENTION

The method and apparatus for producing the low precipitation rate sprinkler of this invention provides a fixed pattern type sprinkler with attainable precipitation rates equivalent to the precipitation rates of rotary stream sprinklers. This makes it possible to operate rotary and spray type sprinklers on the same supply circuit and for the same length of time thereby reducing the cost and simplifying the operating of the irrigation system. The detailed descriptions following will describe the invention as applied to presently conventional spray type sprinklers. This invention provides a means of reducing the effective time of operation of the sprinkler while using conventional flow rate nozzles. The reduction of sprinkling time is accomplished by interrupting the flow of water to the sprinkler nozzle. This is most obviously accomplished by turning the water supply to the nozzle on and off in timed durations of several seconds. For example, if the water is permitted to flow through the nozzle for a period of 5 seconds and then prevented from flow for 20 seconds, the effective precipitation rate is reduced to one fifth of the normal rate of precipitation for the specific nozzle being used. The method for accomplishing this operation will be described in detail following.

A second advantage of the invention is to provide more uniform distribution of water over the covered area. The distribution of water from fixed pattern spray nozzles is inherently non-uniform having the most water concentrated in an annular area an appreciable distance from the nozzle. The uniformity of distribution of water is improved due to the radial propagation and decay of the spray stream as the flow is started and stopped.

More specifically, in accordance with the method of the present invention for reducing the effective precipitation rate of an irrigation sprinkler during an irrigation cycle, the method includes the steps of initiating an irrigation cycle to supply a constant source of pressurized water into the casing of the sprinkler, and sequentially blocking and then unblocking the flow of water within said casing from said source to said nozzle without disrupting the supply of pressurized water to said casing, thereby to sequentially cycle the flow of water from said source to said nozzle without interrupting the irrigation cycle.

Typically, the apparatus of the present invention will be used in an irrigation sprinkler of the type comprising a casing having a water inlet connection at the bottom for coupling the sprinkler with a pressurized source of water and a cap at the top end, and an extensible tubular riser having a water directing bore disposed within the case for movement between a retracted inoperative position within the casing and an extended operative position projecting through the cap out of the casing, the riser including a spray nozzle at its upper end and an entrance end disposed within the casing below the cap, the riser serving to direct water from the source to the nozzle for irrigating an area extending outwardly from the sprinkler. In accordance with the apparatus of the invention, a flow stop valve assembly is coupled to the entrance end of the riser within the casing, and includs a valve head adapted to move between an open and a closed position, respectively unblocking and blocking the entrance end of the riser, and a lost motion piston and cylinder assembly coupled to said valve head for moving said valve head between said open and closed positions, said lost motion piston and cylinder assembly including a piston cyclically moveable within a cylinder between an upper and a lower position for effecting closing and opening, respectively, of said valve head. A water flow path is provided extending between said cylinder below said piston and said bore of said riser above said valve head, and a first flow control device is disposed in said water flow path for limiting the rate of flow of water through said water flow path when said piston is moving downwardly within said cylinder. A second flow control device is disposed in said flow path for limiting the rate of flow of water through said water flow path when said piston is moving upwardly within said cylinder, whereby the time during which said valve head is in said closed position is controlled by said first flow control device, and the time during which said valve head is in the open position is controlled by said second flow control device.

Other features and advantages of the present invention will become more apparent from the following detailed description taken in conjunction with the accompanying drawings which illustrate, by way of example, the principles of the invention.

DETAILED DESCRIPTION OF PRESENTLY PREFERRED EMBODIMENTS

Figure 1:
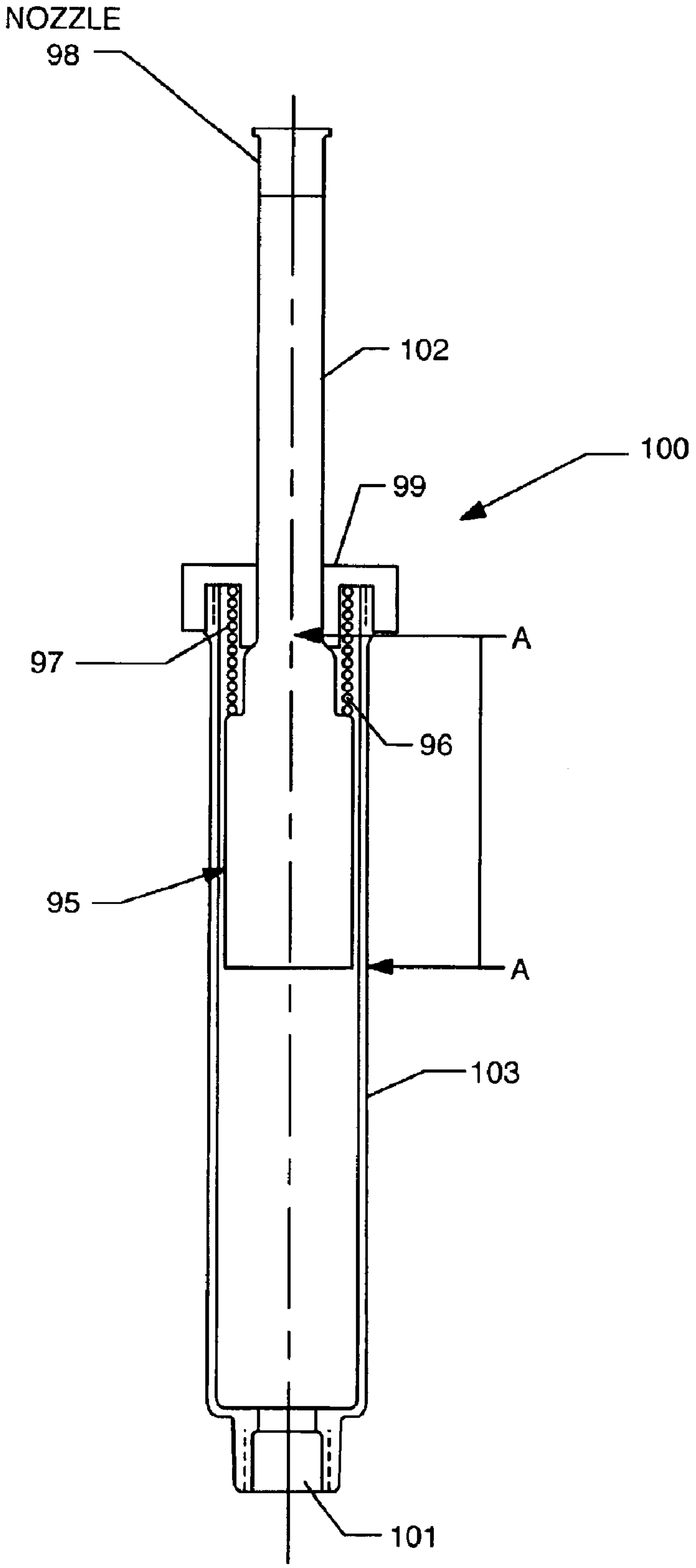
FIG. 1 is a schematic cross-sectional view of a pop-up irrigation sprinkler of the general type to which the present invention is applied and shown in the operative position.

As shown in the exemplary drawings, the present invention is embodied in a spray type sprinkler 100, herein of the pop-up sprinkler of generally conventional type, and which is intended to water a fixed area around the sprinkler. In this instance, the sprinkler 100 includes a cylindrical casing 103 adapted to be buried in the ground, and having a water supply inlet 101 at the bottom for attachment to a source of pressurized water, and a cover 99 overlying the top of the casing. Disposed for reciprocation between an extended upper operating position, as shown in FIG. 1, and a lower inoperative position retracted inside the casing 103, is a hollow tubular riser 102 having an internal bore 126, extending between a lower end disposed within the casing and an upper end adapted to project above the casing and cover, and having a spray nozzle 98 removably attached thereto.

A conventional retract spring 97, herein a coil spring, is disposed around the riser 102 within the casing 103, and has one end abutting the underside of the cover 99 and the other end abutting an enlarged upwardly facing radial surface 96 surrounding the lower end of the riser. The retract spring 97 operates to bias the riser 102 to the inoperative, retracted position within the casing 103 when no water pressure is supplied to the sprinkler, and to compress to the position shown in FIG. 1 when water pressure is admitted to the sprinkler casing inlet 101, and the riser is extended to the upper, operative position.

When in normal use, pressurized water enters the inlet 101 and flows through the riser 102 to the upper end where it is ejected outwardly away from the sprinkler 100 through the nozzle 98 in a fan-shaped spray pattern and at a precipitation rate determined by the spray nozzle and water supply pressure utilized. Depending on the type of nozzle 98 installed on the riser 102, the spray pattern can be any shape, typically from a full circle to a small pie-shaped part circle, such as a quarter circle pattern. When the supply of pressurized water is shut off, the retract spring 97 moves the riser 102 downwardly to the retracted inoperative position inside the casing 103. It should be noted that each time the supply of pressurized water is admitted to the casing 103, the rise in internal pressure causes the riser 102 to extend upwardly to the operative position, and as water pressure builds within the riser, water ejected though the nozzle 98 results in a spray pattern that initially extends radially outwardly from adjacent the sprinkler 100 to the maximum distance away from the sprinkler for the specific nozzle and supply pressure utilized. On shutting off the supply of pressure to the casing inlet 101, the water pressure decreases so that as the riser 102 retracts to the inoperative position within the casing 103 and, the spray pattern decays from the maximum radial distance back to the area adjacent the sprinkler. Thus, with each cycle of sprinkler operation, the area around the sprinkler 100 is watered from adjacent the sprinkler out to the maximum radial distance of throw of the nozzle. In accordance with the present invention, a water flow interrupter assembly, generally designated by reference numeral 95, is disposed within the water supply passage to the nozzle, herein secured to the lower portion of the riser 102 and moveable therewith, and which functions to periodically shut-off the supply of pressurized water to the nozzle for a predetermined period of time without interrupting the supply of water from the source to the inlet 101 of the sprinkler 100. The flow interrupter assembly 95 operates in a highly effective and efficient manner to permit controlled reduction in the effective precipitation rate of the sprinkler 100, and allows the use of any size nozzle 98 and nozzle pattern without effecting the overall lowered precipitation rate of the sprinkler. Moreover, the flow interrupter 95 is relatively simple in construction, reliable in use and economical to manufacture, yet can be utilized with virtually any spray type sprinkler where it is desirable to reduce and control the precipitation rate during an irrigation cycle without having to turn the supply of pressurized water from the source on and off.

Figure 2:
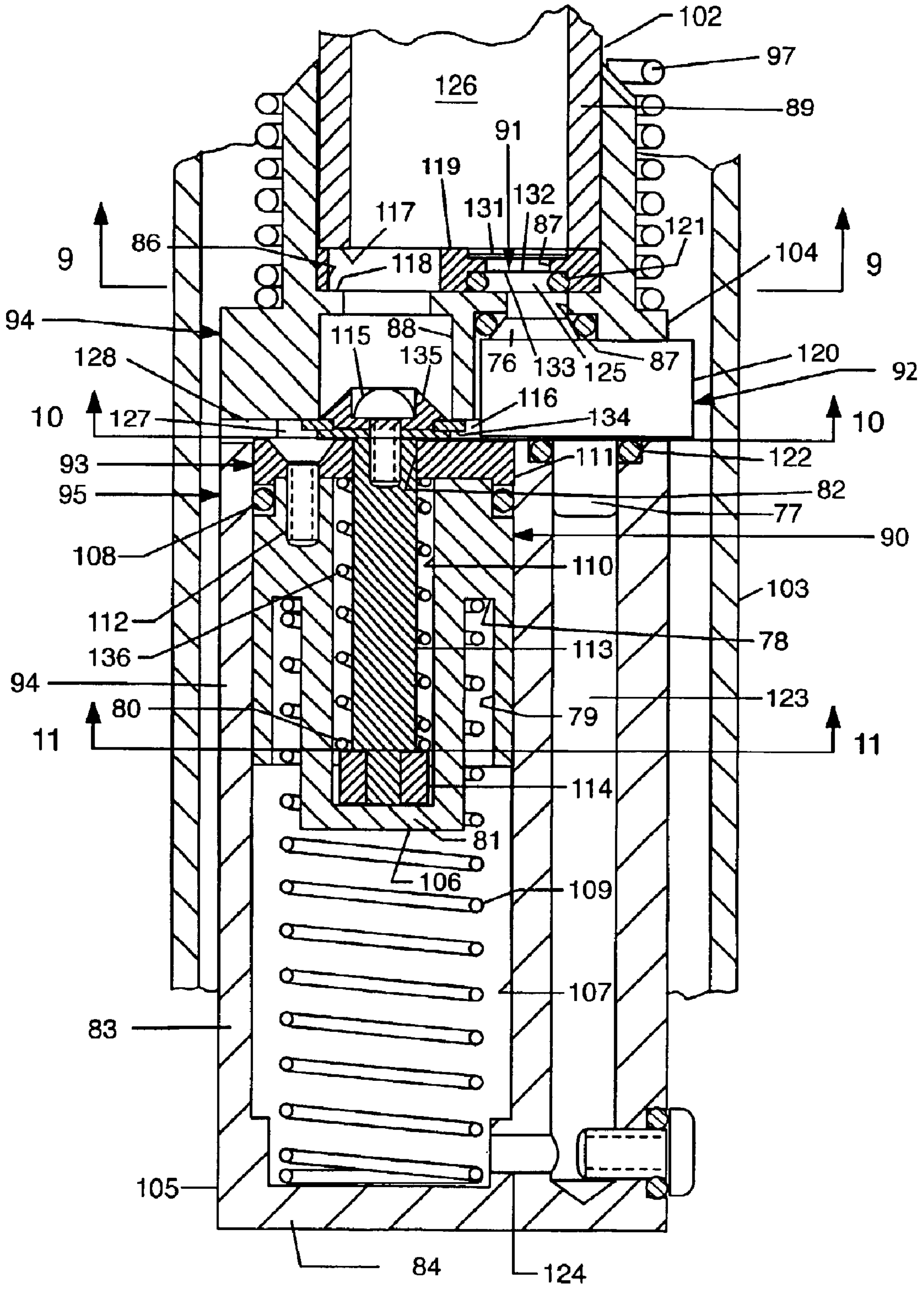
FIG. 2 is an enlarged fragmentary vertical cross-sectional view taken in the direction of the arrows A—A of FIG. 1, and showing the flow stop valve of the present invention in the flow stop position.

Toward the foregoing ends, as can be seen in FIG. 2, the flow interrupter assembly 95 includes a generally cylindrical housing structure 94 secured to the lower end portion of the riser 102 so as to form a lower extension of the riser. The interrupter housing 94, which has an outer diameter less than the inner diameter of the sprinkler case 103 so that water entering the sprinkler inlet 101 can freely flow around the interrupter housing, houses a timing valve assembly, generally designated 93, a first flow control mechanism, generally designated 92, and a second flow control mechanism, generally designated 91, which together operate to periodically admit and shut off water to the riser 102 and nozzle 98 in a timed and controlled manner during each irrigation cycle.

In general, and as will become more apparent hereinafter, the timing valve assembly 93 functions to control the flow of water from the sprinkler inlet 101 into the bore 126 of the riser 102 by utilizing a flow stop valve 116 operated by a lost motion piston and cylinder assembly 90. The first flow control mechanism 92 cooperates with the timing valve assembly to control the length of time that water is prevented from flowing from the source inlet 101 into the riser 102. The second flow control mechanism 91 controls the length of time the flow of water to the riser is permitted, such that during a given irrigation cycle, water is periodically and cyclically admitted to the riser 102 for a preset period of time, and is then stopped for a second preset period of time, thereby reducing the effective sprinkler precipitation rate as compared to a continuous and uninterrupted flow of water to the nozzle 98 during the irrigation cycle.

Figure 4:
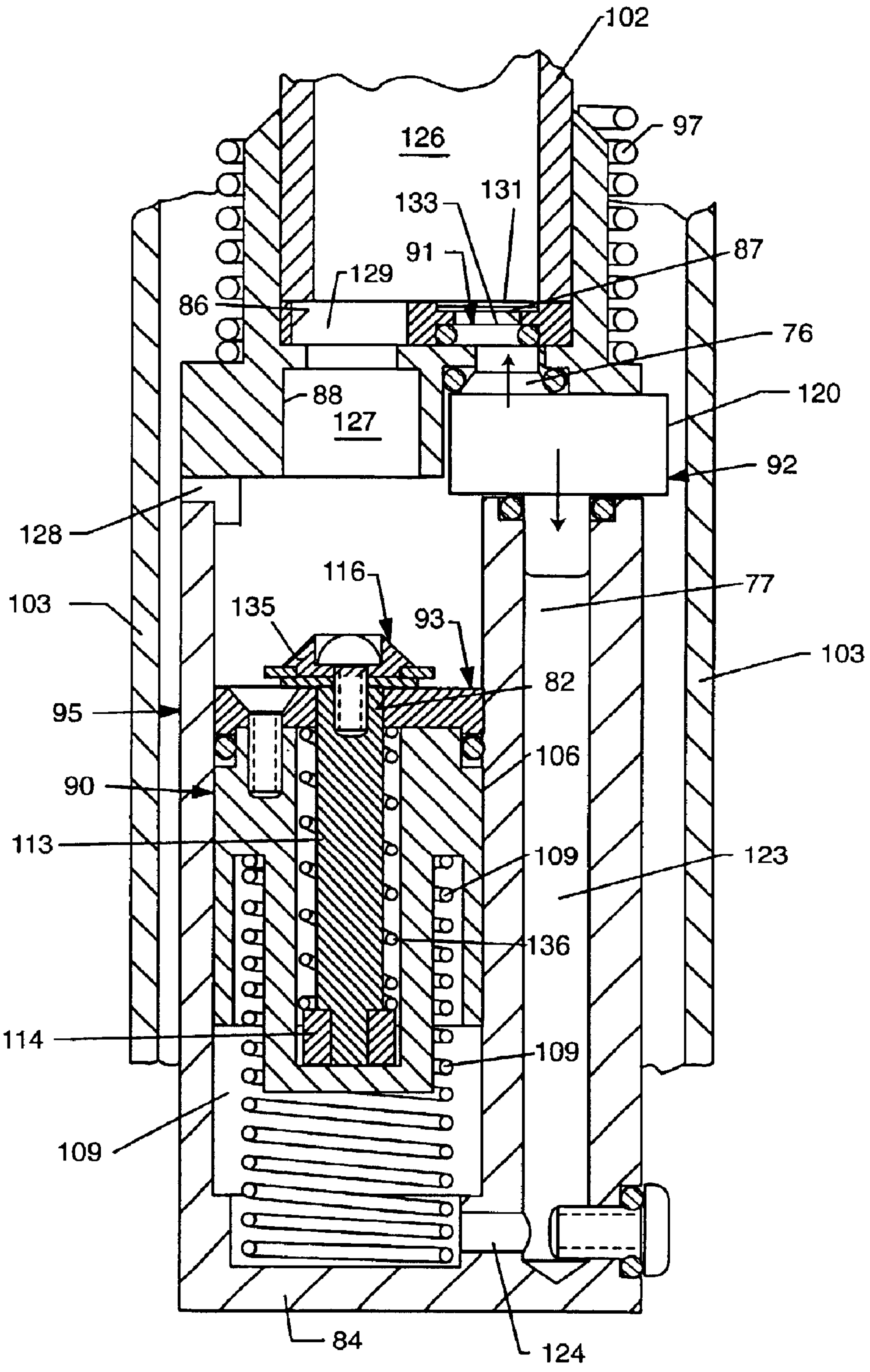
FIG. 4 is an enlarged fragmentary vertical cross-sectional view similar to FIG. 2, but showing the flow stop valve in the open, flow permitting position.

With reference to FIG. 2 which illustrates the sprinkler 100 in a non-spraying mode, it will be seen that water admitted into the sprinkler inlet 101 (not shown in FIG. 2) flows into the case 103 around the riser 102 and housing 94 of the flow interrupter assembly 95. Due to the pressure of the water within the case 103 acting on the lower end of the interrupter housing 94, the riser 102 and attached interrupter housing is caused to extend against the bias of the retract spring 97, to the raised operational position. However, as can be seen in FIG. 2, the flow stop valve 116 prevents any water flow from within the case 103 from entering the riser 102, thus prohibiting water from being ejected from the nozzle 98. Thus, notwithstanding that the riser 102 has extended to the operative position, no water can be sprayed until the flow stop valve 116 has first opened to permit water from the source to flow into the riser. FIG. 4 illustrates the fully open condition with the flow stop valve 116 moved away from the sealing position so that water can flow from the source into the riser 102 for spraying from the nozzle 98.

More specifically as best seen in FIG. 2, the interrupter housing 94 herein includes an upper housing or cover section portion 104 and a lower housing section 105, each having a generally cylindrical shape. Herein, the upper housing section 104 includes an upper cylindrical end portion 89 that surrounds and provides an internal surface to which the lower open-ended portion of the riser 102 is secured. Below the cylindrical end section 89, the upper housing 104 defines a first enlarged open passageway 88 extending vertically from the lower end of the upper housing to the inlet end of the riser 102 for permitting water to flow into the riser from the source. Adjacent the first passageway 88, a second generally vertical passageway 87, herein of smaller size, is formed between the lower end of the upper housing 104 and the inlet end of the riser 102, and through which a controlled flow of water into and out of the riser takes place, as will be explained in more detail below. In this instance, disposed between the lower end of the riser 102 and the upper end of the upper housing 104 is a disc-shaped filter plate 119 having a first opening 86 formed to be concentric with the first enlarged passageway 88, and a second opening 85 disposed to overlie the second passageway 87. The filter plate 119 herein forms a mounting structure for a disc-shaped filter screen 131 disposed to filter water flowing through the second opening 85 and passageway 87, and a metering orifice plate 132 which functions as the second flow control mechanism 91, as will become more apparent hereinafter.

The lower section 105 of the interrupter housing 94 herein is formed to have a closed bottom wall 84 and an upwardly projecting cylindrical side wall 83 to the top of which the upper housing section 104 is secured. Formed within in the lower section 105 of the interrupter housing 94 is a first enlarged upwardly open cylindrical chamber 107 forming a cylinder of the piston and cylinder assembly 90, and the centerline of which is aligned with the centerline of the first passageway 88 through the upper housing section 104. To allow pressurized water from the source flowing around the interrupter housing 94 to flow into the housing to the riser 102 from the sprinkler inlet 101, one or more laterally directed ports 128 are formed in the upper end of the lower housing section 105, and which connect with a cylindrical cavity 127 disposed between the underside of the upper housing section 104 and the upper open end of the cylinder 107.

Figure 3:
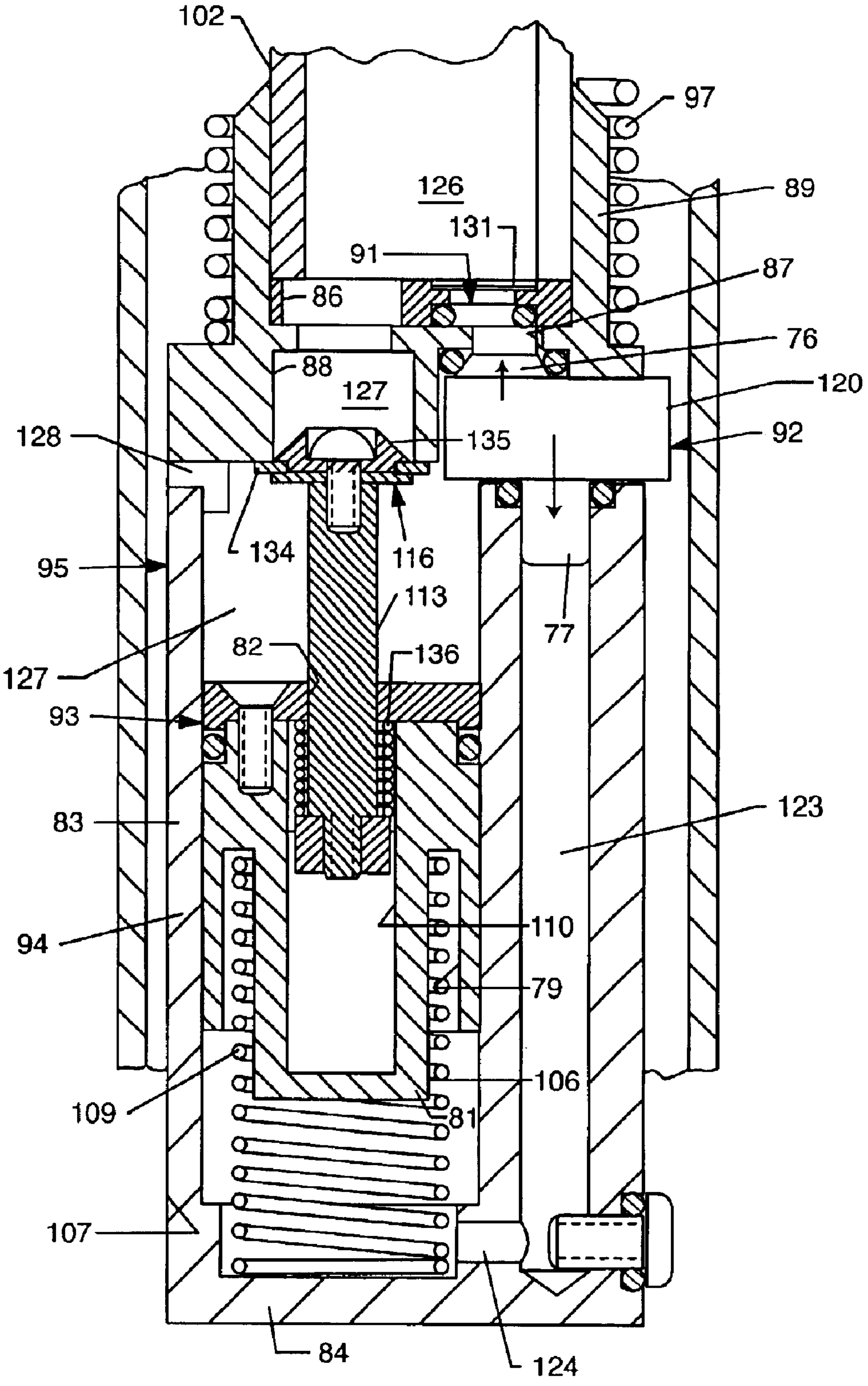
FIG. 3 is an enlarged fragmentary vertical cross-sectional view similar to FIG. 2, but showing the flow stop valve in a second position just prior to opening.

The flow stop valve 116 is disposed for reciprocation within the cylinder 107 and includes a flow-stop valve head 135 having a resilient seal washer 134 attached thereto disposed to seat against and seal the inlet to the first passageway 88, and a downwardly projecting valve stem 113 slideably supported by the lost motion piston and valve assembly 90. In this instance, as best seen in FIG. 3, the lost motion piston and valve assembly 90 includes a generally cylindrical piston body 106 having an upper end cap 111 formed with a central aperture 82 through which the valve stem 113 of the flow stop valve 116 projects and is guided. Centrally disposed within the piston body 106 is a upwardly open bore 110 having a closed bottom 81 into which the stem 113 of the valve 116 projects and is movable between an upper and lower position. As can best be seen in FIGS. 2 through 4, a compressible spring 136, herein a coil spring, is disposed around the valve stem 113, one end of which abuts the under side of the end cap 111 and the other end of which abuts an enlarged radial surface 80 of nut 114 threaded to the lower end of the valve stem.

The piston body 106 is also formed with a cylindrical, donut-shaped recess 79 extending upwardly from the bottom of the piston body radially outwardly of the closed bore 110 and having a closed upper end 78, and within which is disposed a second compression spring 109, herein a coil spring. The second spring 109 extends between the bottom of the cylinder 107 the closed upper end 78 of the cylindrical recess 79 to bias the piston body 106 upwardly. The combination of the compression spring 136 acting on the valve stem 113 and the compression spring 109 acting on the piston body 106 cooperate to form the lost motion connection for operating the flow stop valve 116 by permitting the piston body to be moved downwardly within the cylinder 107 without moving the flow stop valve until the valve stem spring 136 has been fully compressed against the cover end cap 111, as best seen in FIG. 3.

Importantly, for purposes of interconnecting the inside of the cylinder 107 below the piston body 106 to the inside of the riser 102, the housing 94 is provided with a flow port 124 extending laterally from the bottom of the cylinder 107 to an upwardly directed flow passage 123 extending along the side of the cylinder 107 to the second passageway 87, whereby water can flow through the port 124 and flow passage 123 between the cylinder 107 and the riser 102 through the first and second flow control mechanisms, 92 and 91, respectively. Thus, when the piston assembly 90 is moved downwardly within the cylinder 107, water within the cylinder below the piston assembly is forced from the cylinder to the riser 102 through the port 124 and the flow passage 123.

Herein, the first flow control mechanism 92 controls the rate at which water can flow from the cylinder 107 into the riser 102, while the second flow control mechanism 91 functions to control the rate at which water can flow from the riser back into the cylinder. More specifically, the first flow control mechanism 92 controls the rate at which water can be forced out of the cylinder 107 as the piston assembly 90 is moved downwardly by providing a restriction to the flow of water between the cylinder and the riser 102. In this instance, the restriction is provided by employing as the first flow control mechanism 92, a conventional pressure compensating drip irrigation emitter herein designated 120, such as of the type illustrated and described in U.S. Pat. No. 5,820,029 owned by Rain Bird Corporation, the disclosure of which is incorporated herein by this reference, and which is disposed to have an inlet 77 for receiving water from the cylinder 107 and an outlet 76 directing water to the second passageway 87. This flow control device restricts the flow of water by employing a pressure responsive diaphragm overlying a tortuous path groove such that the inlet pressure of water entering the emitter causes the diaphragm to restrict the groove cross-sectional size and thereby limit the flow of water at the outlet 76 to a preset amount, regardless of inlet pressure. Notably, the pressure compensating emitter 120 is a "one-way" device such that water flow in an opposite direction, that is from the outlet 76 to the inlet 77 toward the cylinder 107, is not restricted by the internal diaphragm, but rather is free flowing, the only restriction being that provided by the cross-sectional size of the emitter inlet and outlet openings.

As can be seen in the sequence of positions of the timing valve assembly 93 shown in FIGS. 2 through 4, with the flow stop valve 116 blocking flow to the riser 102 and the piston assembly 90 in the position shown in FIG. 2, the pressure of water admitted from the source though the inlet 101 of the casing 103 and port 128 acts on piston assembly 90 in a downward direction. Once the force from water pressure has exceeded the force of the spring 136, the piston assembly 90 will move downwardly into the cylinder 107, forcing water within the cylinder below the piston to flow through the port 124 and first flow control device 92, herein the emitter unit. To effect a lost motion connection between the piston assembly 90 and the flow stop valve head 135, the valve spring 136 disposed around the valve stem 113 is selected to require less force for total compression than the upwardly acting force from water pressure on the lower face of the valve head 135 so that as the piston body moves downwardly in the cylinder 107, the valve head remains in the flow stop position, and the valve spring 136 compresses within its cavity, as shown in FIG. 3. Upon reaching full compression of the valve spring 136, as shown in FIG. 3, the continued downward movement of the piston body 106 results in the valve head 135 being pulled downwardly by the end cap 111 acting on the top of the compressed spring and radial surface 80 of nut 114. Notably, once the valve head 135 has initially opened to permit flow from the chamber 127 through the first passageway 88 into the riser 102, the upward force from water pressure on its lower face is released, and the valve spring 136 will extend and snap the valve head downwardly to the fully retracted position within the cavity 110 to permit unrestricted flow of supply water into the riser 102, as seen in FIG. 4.

Once the valve head 135 has snapped to the fully open position and water is permitted to flow unrestricted to the riser 102, the fluid pressure above the flow control devices 91 and 92 will build to a level substantially equal to the pressure above the piston assembly 90, thereby eliminating the fluid pressure differential across the piston body 106. The piston spring 109 will then begin to move the piston body upwardly within the cylinder 107, thereby reducing the pressure below the piston body and drawing water downwardly from the riser 102 through the flow control devices 91 and 92 and flow passage 123 into the cylinder. The second flow control device 91, which in this instance is formed by a simple circular orifice 133 in the orifice plate 132, restricts the rate of flow of water downwardly into the cylinder, thereby controlling the time required for the piston assembly 90 to move to the fully upward position within the cylinder and close inlet of the first passageway 88 to the riser 102 and effect a shut off of water to the nozzle 98.

More specifically, the orifice plate 132 is formed with an orifice 133 dimensioned to control the flow of water from the riser 102 toward the cylinder 107 so as to require the desired time for the water to flow into the cylinder, permitting piston assembly 90 and valve head 135 to move upward from the force of spring 109 as it extends, and stop valve 116 to seat against the inlet to the first passageway 88 and stop the flow to the nozzle 98. Similarly, the first flow control device 92 is selected to permit a flow rate that will restrict the outflow of water from the cylinder 107 such that the lost motion piston assembly 90 will not open the valve head 135 for a selected period of time after closure. Notably, since the first flow control device 92 employs a pressure compensating emitter unit, the time interval required for opening the valve head 135 is independent of the pressure of the incoming supply water. Similarly, since closure of the valve head 135 is effected solely by the spring 109 and flow rate of the orifice plate 132, the pressure of the water within the sprinkler housing 103 and riser 102 does not have any effect on the rate of closure and time the flow stop valve 116 remains open. Thus, by controlling the flow rates of the first and second flow control devices 92 and 91, respectively, and appropriate selection of the spring 109 for the size of piston and cylinder assembly 90, the sprinkler 100 can be designed to operate in such a manner as to reduce the precipitation rate over a wide range to a desired level through cycling of the water flow to the riser 102.

By way of example, in a model constructed by employing a pressure compensating emitter manufactured by Rain Bird Corporation, under its model Number XB-05 having a one-half gallon per hour flow rate for the first flow control device 92, and an orifice plate 132 having an orifice 133 of approximately one sixteenth of an inch in diameter for the second flow control device 91, with a one half inch diameter piston 106 having a stroke of approximately one half inch, a ratio of "on" to "off" of one to three was obtained. That is, with the set parameters, the flow of water to the riser 102 was permitted for approximately one second, and the flow was stopped for approximately three seconds. Thus, the precipitation rate of the sprinkler 100 was reduced to one quarter of its normal level with out the present invention.

FIGS. 5 through 8 illustrate another embodiment of the present invention wherein the first and second flow control devices 92' and 91', respectively, are disposed to both lie along the centerline of the piston and cylinder assembly 90', as opposed to side-by-side as in the embodiment of FIG. 2. In this instance, as shown by the arrows in FIG. 5, water from the sprinkler inlet is directed around the piston and cylinder housing 94' through a plurality of circumferentially disposed channels 60 extending axially around the housing 94' from the bottom end 84' of the housing to a cylindrical cavity 127' above the piston body 106' whereby water from the source can communicate with the cylindrical cavity and act on the piston and valve assembly 90'. This construction lends itself to a more compact unit capable of use in a smaller diameter sprinkler casing 103'.

Figure 5:
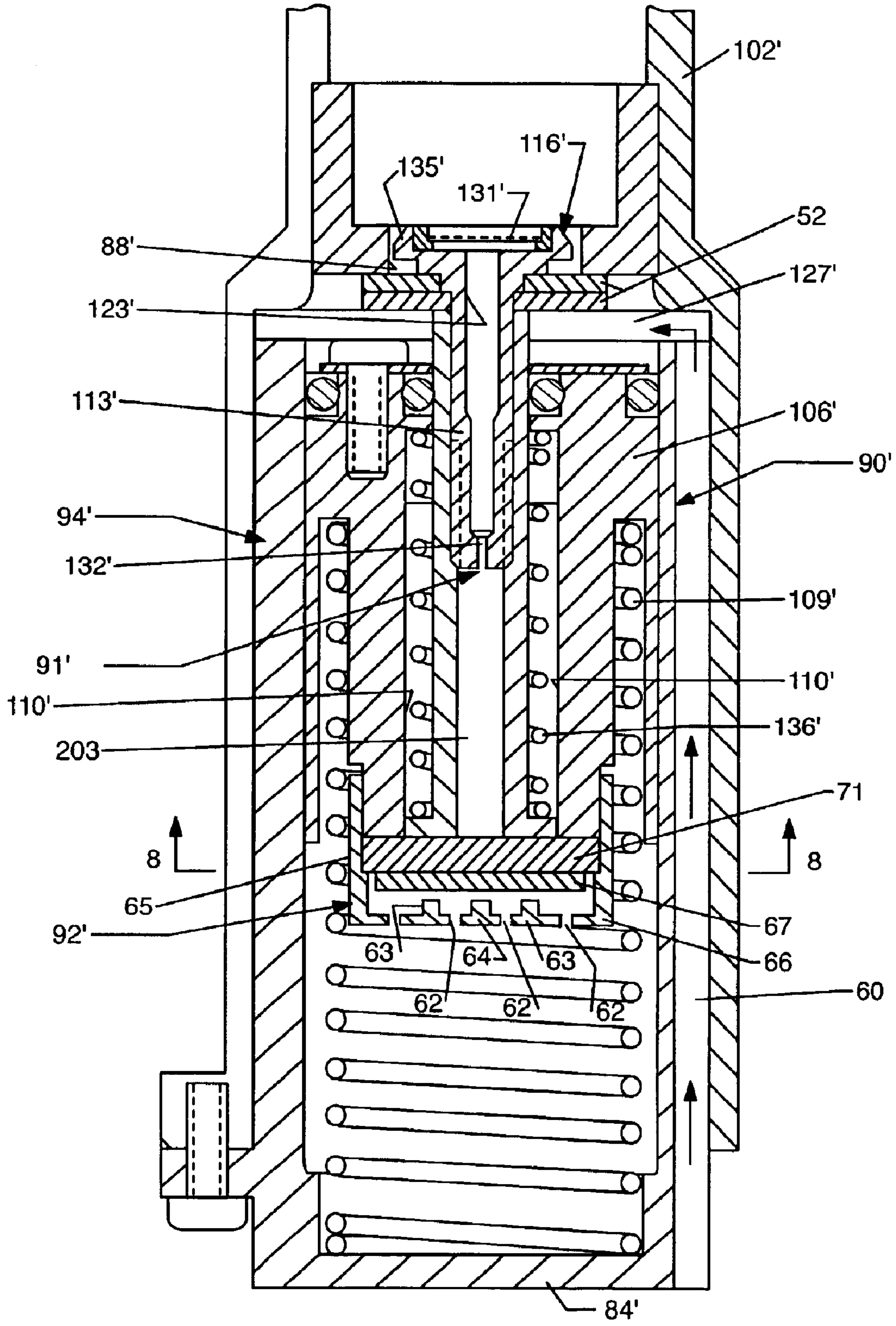
FIG. 5 is an enlarged fragmentary vertical cross-sectional view similar to FIG. 2, but showing a second embodiment of the present invention with the flow stop valve in the flow stop position.
Figure 8:
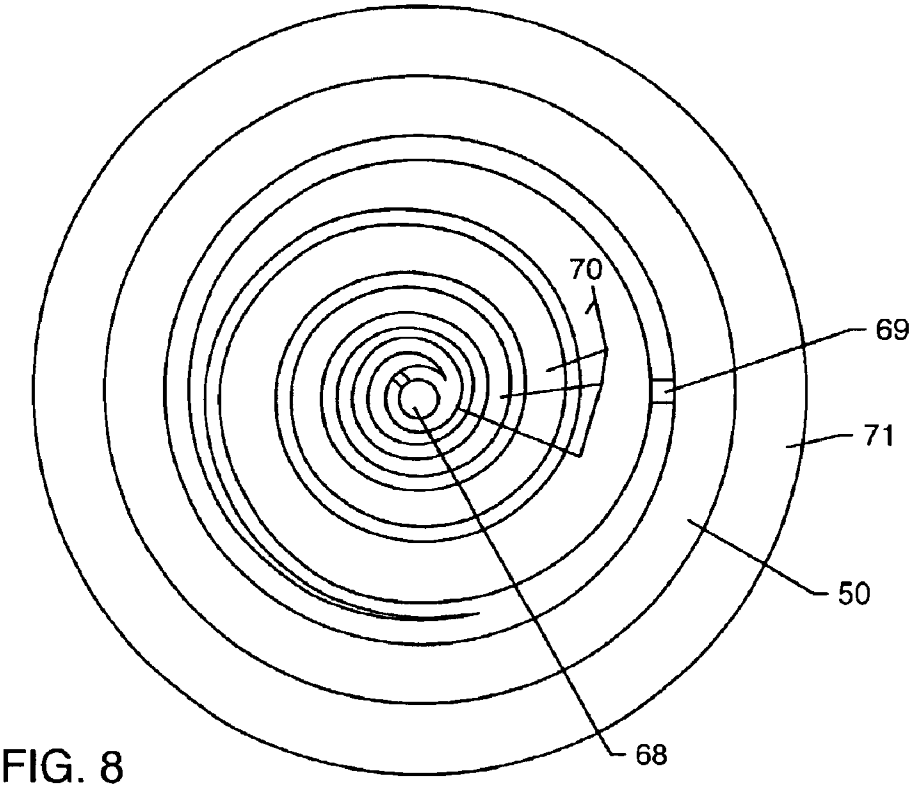
FIG. 8 is an enlarged cross-sectional view taken substantially along the line 8—8 of FIG. 5.
Figure 9:
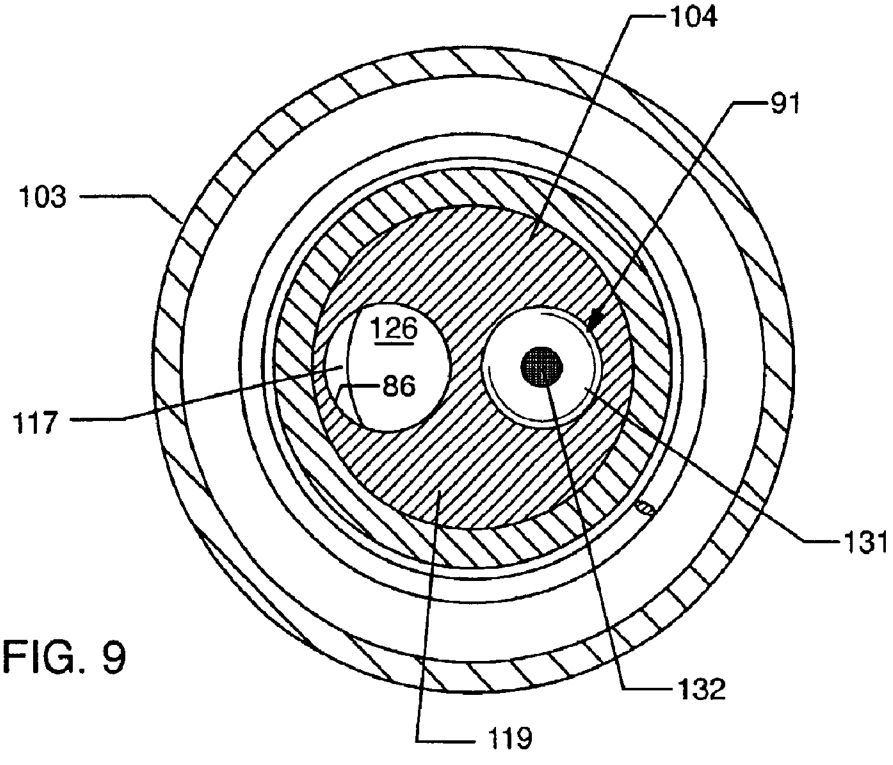
FIG. 9 is an enlarged cross-sectional view taken substantially along the line 9—9 of FIG. 2.
Figure 10:
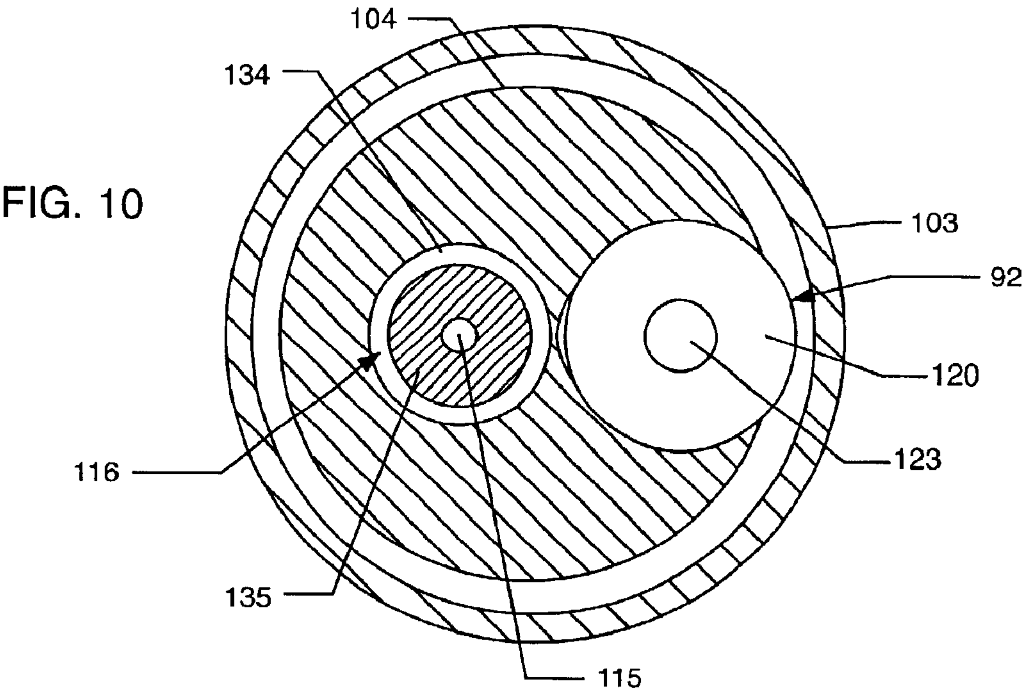
FIG. 10 is an enlarged cross-sectional view taken substantially along the line 10—10 of FIG. 2.
Figure 11:
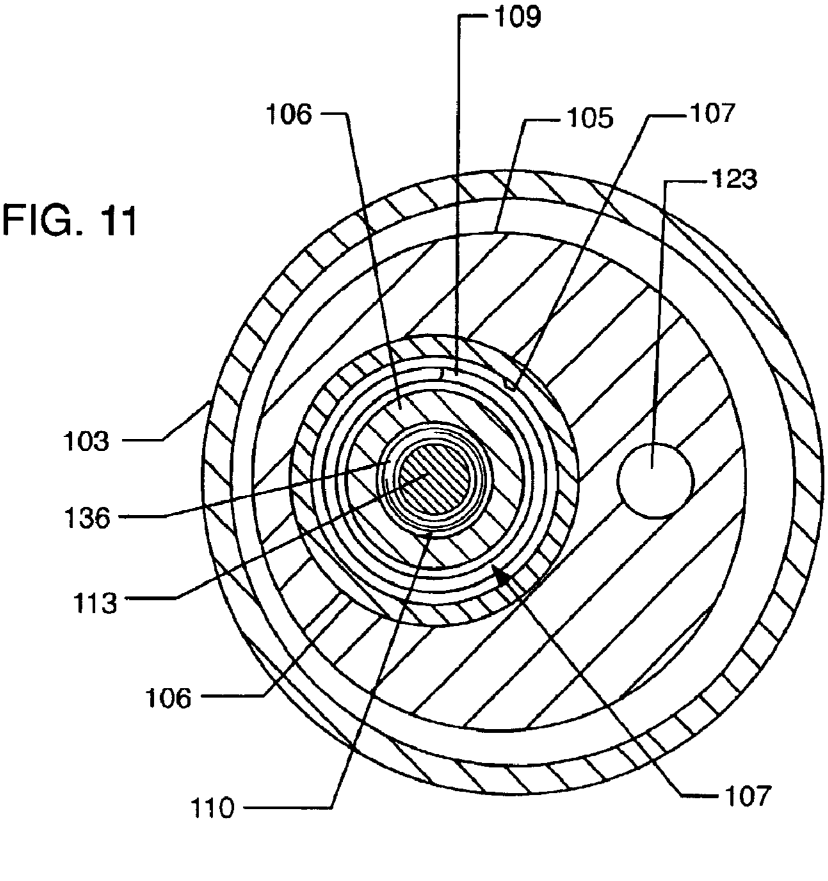
FIG. 11 is an enlarged cross-sectional view taken substantially along the line 11—11 of FIG. 2.

As best seen in FIGS. 5 and 8, the first flow control device 92' is attached to and forms the bottom of the cylindrical center bore 110' of piston body 106'. Herein, as best seen in FIGS. 5 and 8, the first flow control device 92' is formed by a disc shaped body 71 having an upwardly closed tortuous path groove 70 formed in its lower face, and which has an outer annular chamber 50 leading to an inlet 69 through which water can enter the groove 70. At the center of the body 71 is an upwardly opening outlet 68 which leads to an upwardly directed central passage 203 formed through the center of the piston stem 113'. Underlying the disc shaped body 71 is a free floating rubber diaphragm 67, the disc shaped body and the diaphragm being retained in place by a cup-shaped cover 66 having a peripheral skirt portion 65 secured around the lower end of the piston body 106', and a horizontally disposed cap portion 64 including several upstanding ribs 63 disposed to hold the diaphragm away from the cap portion.

As should be understood to those having some knowledge of flow control devices employing pressure responsive diaphragms pressing against low restricting grooves such as used in the drip irrigation field, the diaphragm 67 herein has a diameter sufficient to permit water to flow around its periphery and enter inlet 69. To permit water from the cylinder 110' to flow through the first flow control device 92', the cap portion 64 is provided with several through holes 62 so that water can enter the cover 66 and flow into the annular chamber 50 and inlet 69 of the disc shaped body 71. Notably, as is the case with the emitter used in the first embodiment, water pressure within the cylinder 110' caused by the downward movement of the piston body 106' acts on the diaphragm 67 to press it into the groove 70 and restrict the cross-sectional size of the groove to thereby form a pressure compensating flow control device. During reverse flow through the flow control 92', however, the ribs 63 hold the diaphragm 67 away from the holes 62 to permit unrestricted flow of water from the chamber 203 back into the cylinder 107.

The second flow control device 91' herein is formed as a metering or restrictive passageway 132' extending centrally from the bottom of the valve stem 113'' of the flow stop valve 116' to a centrally disposed flow passage 123' leading upwardly through the valve head 135' to the riser bore 126'. In this instance, the restrictive passageway 132' has a cross-sectional diameter sufficient to limit the downward flow of water from the riser bore 126' to the desired level, just as the orifice 133 of the first embodiment limits flow through the orifice plate 132. Like the embodiment of FIG. 2, the water flowing from the riser 126' downwardly through the flow passage 123' and restrictive passageway 133' is filtered by a filter screen 131', herein disposed in the valve head 135' at the entrance end of the flow passage.

Figure 6:
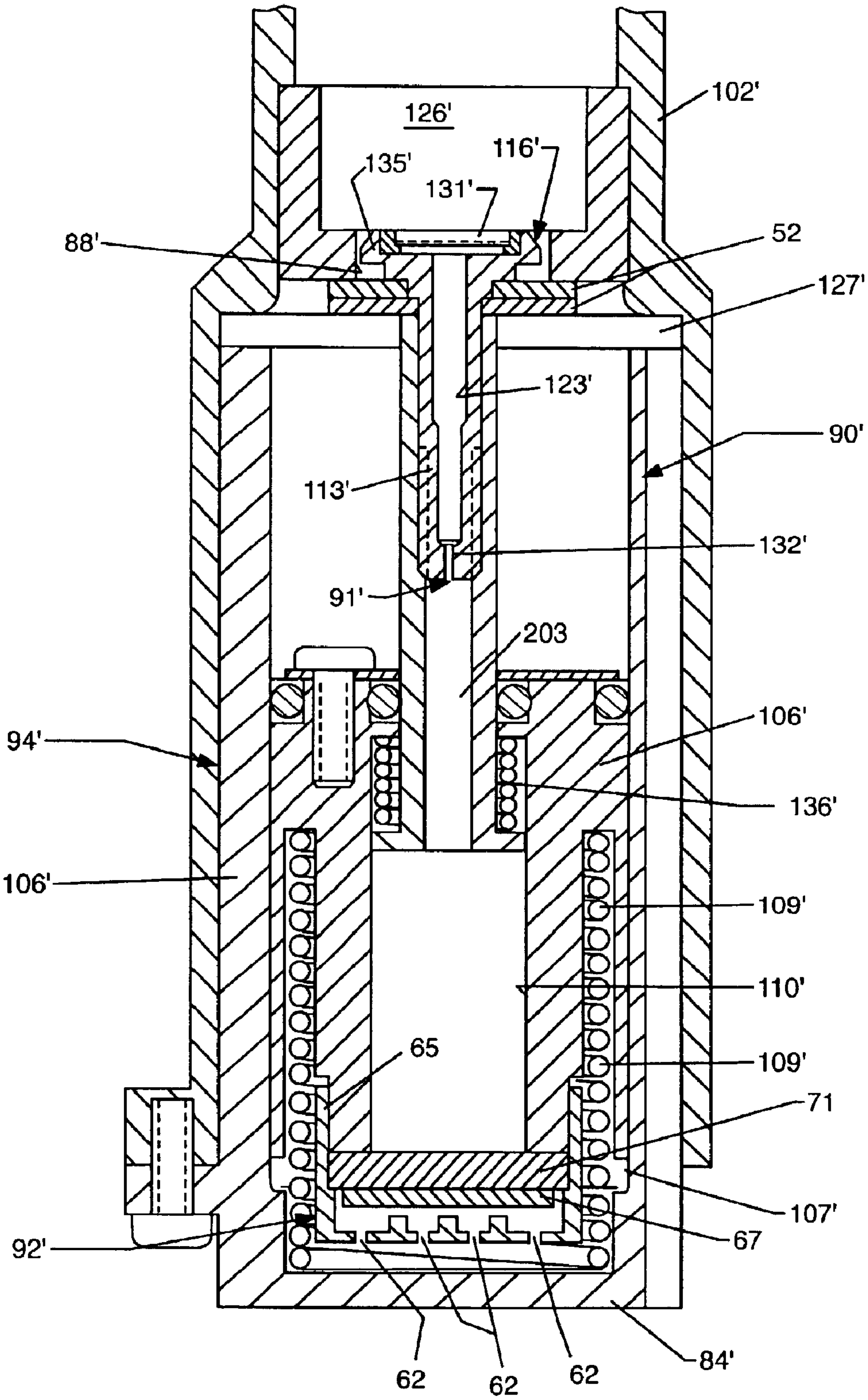
FIG. 6 is an enlarged fragmentary vertical cross-sectional view similar to FIG. 5, but showing the flow stop valve in a second position just prior to opening.
Figure 7:
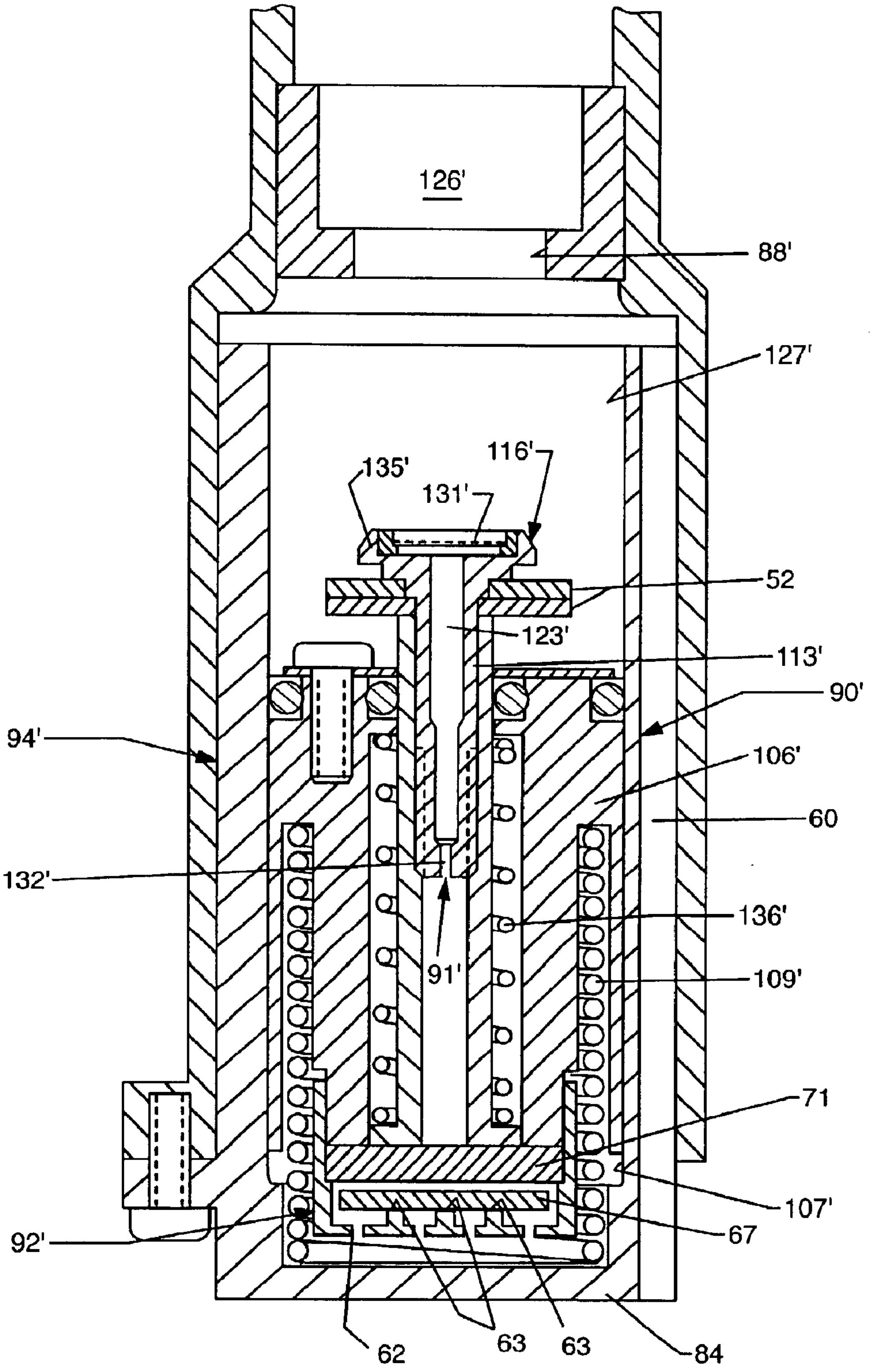
FIG. 7 is an enlarged fragmentary vertical cross-sectional view similar to FIG. 5, but showing the flow stop valve in the open, flow permitting position.

In operation of the embodiment of FIGS. 5–8, with the flow stop valve 116' in the closed position as shown in FIG. 5, upon initiation of an irrigation cycle, water pressure from the source is admitted to the sprinkler casing inlet 101 (not shown in FIGS. 5–8) and flows through the plurality of channels 60 into the chamber 127', thereby applying water pressure to the top of the piston body 106'. The application of water pressure to the piston body 106' causes the piston body to move downwardly in the cylinder 107' against the bias of the spring 109', the rate of movement being controlled by the rate at which water from under the piston body can flow through the first flow control device 92' to the riser 126'. As the piston body 106' moves downwardly, like the embodiment of FIG. 2, the lost motion connection between the flow stop valve stem 113' and the piston body allows the piston body to move downwardly as seen in FIG. 6 before the flow stop valve 116' is opened to allow unrestricted water flow from the source into the riser. In this instance, the flow stop valve 116' as shown as having valve head 135' that projects into the opening 88' to the riser bore 126', the valve having a pair of integral diameter sealing disks 52 attached to the valve stem 113' below the valve head and which seal the opening 88' from the chamber 127' when the flow stop valve is in the closed position, as shown in FIG. 5.

Herein, as pressure within the chamber 127' initially forces the piston assembly 90' downwardly, like the embodiment of FIG. 2, the piston body 106, moves downwardly while the valve head 135' and stem 113' remain stationary in the flow shut-off mode and valve spring 109' compresses. Upon reaching the limits of the lost motion connection, the valve stem 113' is pulled downwardly with the piston body 106' pulling the valve head 135' downwardly out of sealing engagement with the inlet to the passageway 88' leading to the riser bore 126'. Once the valve head 135' begins to open, water pressure and the valve stem spring 136' snaps the valve head to the fully open position shown in FIG. 7.

Following the opening of the flow stop valve 116', the water pressure sensed by the piston body 106' both at it upper face and at its lower face inside the cylinder 107' is substantially the same since water pressure inside the riser 126' communicates with the inside of the cylinder through the passage 123' and restrictive passageway 132'. Since the pressure across the piston body 106' is substantially the same, the piston body begins to move upwardly within the cylinder 107' under the force of the cylinder spring 109'. The rate of upward movement of the piston body 106' is controlled by the rate at which water can flow from the riser 126' through the restrictive passageway 132' so that a finite and controlled time is required for the piston and valve assembly 90' to return to the position shown in FIG. 5 with the flow of water to the riser 126' shut off. As previously noted in connection with the embodiment of FIG. 2, through proper selection of the size of the elements of the piston and valve assembly 90', including the cylinder and valve springs 109' and 136', together with the flow rates of the first and second flow control devices, 92' and 91', respectively, the cycle time for maintaining the flow stop valve 116' in the opened and the closed positions can be accurately controlled during an irrigation cycle, thereby allowing the precipitation rate of the overall sprinkler 10 to be reduced to a desired level relative to the same sprinkler operating on a continuous basis.

From the foregoing, it should be apparent that the present invention provides a new and improved method of reducing the precipitation rate of a spray type irrigation sprinkler without affecting the supply of water during an irrigation cycle. Moreover, the apparatus of the present invention is relatively simple in design and reliable in use , and provides a very accurate means for reducing the precipitation rate of a sprinkler to virtually any desired level. In this connection, while the first flow control device has been described herein in connection with the use of a conventional pressure compensating drip emitter type device, those skilled in the art will appreciate that other types of flow control devices may be suitable for use in performing the flow control function described herein. Further, while the second flow control device has been described herein as having the form of a controlled size orifice or passage, it should be apparent that other forms of flow control could be substituted for the presently preferred structure disclosed herein with out departing from the spirit and scope of the present invention. Similarly, it will be appreciated that various other modifications and changes can be made without departing from the spirit and scope of the present invention.

What is claimed is:

1. In an irrigation sprinkler of the type comprising a casing having a water inlet connection at the bottom for coupling the sprinkler with a pressurized source of water and a cap at the top end, and an extensible tubular riser having a water directing bore disposed within the case for movement between a retracted inoperative position within the casing and an extended operative position projecting through the cap out of the casing, the riser including a spray nozzle at its upper end and an entrance end disposed within the casing below the cap, the riser serving to direct water from the source to the nozzle for irrigating an area extending outwardly from the sprinkler, the improvement comprising:

a flow stop valve assembly coupled to the entrance end of the riser within the casing including a valve head adapted to move between an open and a closed position, respectively unblocking and blocking the entrance end of the riser, and a lost motion piston and cylinder assembly coupled to said valve head for moving said valve head between said open and closed positions, said lost motion piston and cylinder assembly including a piston cyclically moveable within a cylinder between an upper and a lower position for effecting closing and opening, respectively, of said valve head;

a water flow path extending between said cylinder below said piston and said bore of said riser above said valve head;

a first flow control device disposed in said water flow path for limiting the rate of flow of water through said water flow path when said piston is moving downwardly within said cylinder; and a second flow control device disposed in said flow path for limiting the rate of flow of water through said water flow path when said piston is moving upwardly within said cylinder, whereby the time during which said valve head is in said closed position is controlled by said first flow control device, and the time during which said valve head is in the open position is controlled by said second flow control device.

2. The improvement as set forth in claim 1 wherein said first flow control device is a one way device restricting the flow of water when flowing from said cylinder to said bore of said riser, but allowing unrestricted flow from said bore of said riser back into said cylinder.

3. The improvement as set forth in claim 2 wherein said first flow control device is a pressure compensating device whereby the volume of flow of water through said first flow control device is independent of the pressure of the source of pressurized water.

4. The improvement as set forth in claim 1 wherein said first flow control device is a pressure compensating device whereby the volume of flow of water through said first flow control device is independent of the pressure of the source of pressurized water, and said second flow control device comprises a flow opening sized to limit the flow of water there through to a preselected rate.

5. The improvement as set forth in claim 4 wherein said first flow control device is a one way device restricting the flow of water when flowing from said cylinder to said bore of said riser, but allowing unrestricted flow from said bore of said riser back into said cylinder.

6. The improvement as set forth in claim 4 wherein said first flow control device includes a flow restricting tortuous path through which water must pass when flowing from said cylinder to said bore of said riser.

7. The improvement as set forth in claim 6 wherein said piston includes a spring biasing said piston toward said upper position within said cylinder.

8. The improvement as set forth in claim 7 wherein said lost motion piston and cylinder assembly includes a downwardly projecting stem attached to said valve head, and said piston includes a chamber into which said stem extends, said stem remaining stationary during an initial portion of the movement of said piston downwardly within said cylinder.

9. The improvement as set forth in claim 8 wherein a spring is disposed within said chamber and biases said stem and valve head toward the open position.

10. The improvement as set forth in claim 9 wherein said passageway extends centrally through said piston and said valve head.

11. The improvement as set forth in claim 9 wherein said first flow restricting device is disposed between said cylinder and the entrance to said passageway, and said second flow restricting device is disposed between said first flow restricting device and said bore of said riser.

12. In an irrigation sprinkler of the type comprising a casing having a water inlet connection at the bottom for coupling the sprinkler with a source of pressurized water and a tubular riser having a water directing bore extending there through with a spray nozzle coupled to the upper end and having an entrance end serving to direct water from the source to the nozzle for irrigating an area extending outwardly from the sprinkler, the improvement comprising:

a flow stop valve assembly coupled to the entrance end of the riser within the casing including a valve head adapted to move between an open and a closed position, respectively unblocking and blocking the entrance end of the riser to the flow of water from the source, and a lost motion piston and cylinder assembly coupled to said valve head for moving said valve head between said open and closed positions, said lost motion piston and cylinder assembly including a piston cyclically moveable within a cylinder between an upper and a lower position for effecting closing and opening, respectively, of said valve head;

a water flow path extending between said cylinder below said piston and said bore of said riser above said valve head;

a first flow control device disposed in said water flow path for limiting the rate of flow of water through said water flow path when said piston is moving downwardly within said cylinder; and a second flow control device disposed in said flow path for limiting the rate of flow of water through said water flow path when said piston is moving upwardly within said cylinder, whereby the time during which said valve head is in said closed position is controlled by said first flow control device, and the time during which said valve head is in the open position is controlled by said second flow control device.

13. The improvement as set forth in claim 12 wherein said first flow control device is a pressure compensating device whereby the volume of flow of water through said first flow control device is independent of the pressure of the source of pressurized water.

14. The improvement as set forth in claim 13 wherein said second flow control device comprises a flow opening sized to limit the flow of water there through to a preselected rate.

15. The improvement as set forth in claim 14 wherein said first flow control device is a one way device restricting the flow of water when flowing from said cylinder to said bore of said riser, but allowing unrestricted flow from said bore of said riser back into said cylinder.

16. The improvement as set forth in claim 15 wherein said first flow control device includes a flow restricting tortuous path through which water must pass when flowing from said cylinder to said bore of said riser.

17. The improvement as set forth in claim 16 wherein said piston includes a spring biasing said piston toward said upper position within said cylinder.

18. The improvement as set forth in claim 17 wherein said lost motion piston and cylinder assembly includes a downwardly projecting stem attached to said valve head, and said piston includes a chamber into which said stem extends, said stem remaining stationary during an initial portion of the movement of said piston downwardly within said cylinder.

19. The improvement as set forth in claim 18 wherein a spring is disposed within said chamber and biases said stem and valve head toward the open position.

20. The improvement as set forth in claim 19 wherein said passageway extends centrally through said piston and said valve head.

21. The improvement as set forth in claim 20 wherein said first flow restricting device is disposed between said cylinder and the entrance to said passageway, and said second flow restricting device is disposed between said first flow restricting device and said bore of said riser.

22. A fixed spray type irrigation sprinkler comprising:

an elongated tubular riser adapted to be coupled at a lower end to a source of pressurized water and having a water directing bore formed therein extending between said lower end and an upper end;

a spray nozzle attached to the riser at its upper end;

a flow stop valve assembly coupled to the lower end of the riser and including a valve head adapted to move between an open and a closed position, respectively unblocking and blocking the lower end of the riser;

a lost motion piston and cylinder assembly coupled to said valve head for moving said valve head between said open and closed positions, said lost motion piston and cylinder assembly including a piston cyclically moveable within a cylinder between an upper and a lower position for effecting closing and opening, respectively, of said valve head;

a water flow path extending between said cylinder below said piston and said bore of said riser above said valve head;

a first flow control device disposed in said water flow path for limiting the rate of flow of water through said water flow path when said piston is moving downwardly within said cylinder; and a second flow control device disposed in said flow path for limiting the rate of flow of water through said water flow path when said piston is moving upwardly within said cylinder, whereby when said riser is coupled to said source of pressurized source of water, the time during which said valve head is in said closed position is controlled by said first flow control device, and the time during which said valve head is in the open position and water from said source is permitted to flow through said bore to said nozzle is controlled by said second flow control device.

23. An irrigation sprinkler as set forth in claim 22 wherein said first flow control device is a pressure compensating device whereby the volume of flow of water through said first flow control device is independent of the pressure of the source of pressurized water.

24. An irrigation sprinkler as set forth in claim 23 wherein said first flow control device is a one way device restricting the flow of water when flowing from said cylinder to said bore of said riser, but allowing unrestricted flow from said bore of said riser back into said cylinder.

25. An irrigation sprinkler as set forth in claim 24 wherein said first flow control device includes a flow restricting tortuous path through which water must pass when flowing from said cylinder to said bore of said riser and a pressure responsive flexible diaphragm overlying said path and operable to restrict the cross-sectional size of said path in response to the pressure exerted by said piston on water in said cylinder as said piston moves downwardly in said cylinder.

26. An irrigation sprinkler as set forth in claim 25 wherein said piston includes a spring biasing said piston toward said upper position within said cylinder.

27. An irrigation sprinkler as set forth in claim 26 wherein said lost motion piston and cylinder assembly includes a downwardly projecting stem attached to said valve head, and said piston includes a chamber into which said stem extends, said stem remaining stationary during an initial portion of the movement of said piston downwardly within said cylinder.

28. An irrigation sprinkler as set forth in claim 27 wherein a spring is disposed within said chamber and biases said stem and valve head toward the open position.

29. An irrigation sprinkler as set forth in claim 27 wherein said passageway extends centrally through said piston and said valve head.

30. An irrigation sprinkler as set forth in claim 29 wherein said first flow restricting device is disposed between said cylinder and the entrance to said passageway, and said second flow restricting device is disposed between said first flow restricting device and said bore of said riser.

31. An irrigation sprinkler as set forth in claim 30 wherein said second flow control device comprises a flow opening sized to limit the flow of water there through to a preselected rate.

32. A fixed spray type pop-up irrigation sprinkler comprising:

A generally cylindrical casing having a water inlet connection at the bottom for coupling the sprinkler with a pressurized source of water; and a cap overlying the top;

an elongated tubular riser having a water directing bore disposed within the case for movement between a retracted inoperative position within the casing and an extended operative position projecting through the cap out of the casing;

a spray nozzle attached to the riser at its upper end, and having an entrance end disposed within the casing below the cap;

a flow stop valve assembly coupled to the entrance end of the riser within the casing including a valve head adapted to move between an open and a closed position, respectively unblocking and blocking the entrance end of the riser;

a lost motion piston and cylinder assembly coupled to said valve head for moving said valve head between said open and closed positions, said lost motion piston and cylinder assembly including a piston cyclically moveable within a cylinder between an upper and a lower position for effecting closing and opening, respectively, of said valve head;

a water flow path extending between said cylinder below said piston and said bore of said riser above said valve head;

a first flow control device disposed in said water flow path for limiting the rate of flow of water through said water flow path when said piston is moving downwardly within said cylinder; and a second flow control device disposed in said flow path for limiting the rate of flow of water through said water flow path when said piston is moving upwardly within said cylinder, whereby the time during which said valve head is in said closed position is controlled by said first flow control device, and the time during which said valve head is in the open position is controlled by said second flow control device.

33. An irrigation sprinkler as set forth in claim 32 further including a retract spring disposed within said casing around said riser and biasing said riser toward said retracted inoperative position.

34. An irrigation sprinkler as set forth in claim 33 wherein said first flow control device is a pressure compensating device whereby the volume of flow of water through said first flow control device is independent of the pressure of the source of pressurized water.

35. An irrigation sprinkler as set forth in claim 34 wherein said first flow control device is a one way device restricting the flow of water when flowing from said cylinder to said bore of said riser, but allowing unrestricted flow from said bore of said riser back into said cylinder.

36. An irrigation sprinkler as set forth in claim 35 wherein said first flow control device includes a flow restricting tortuous path through which water must pass when flowing from said cylinder to said bore of said riser and a pressure responsive flexible diaphragm overlying said path and operable to restrict the cross-sectional size of said path in response to the pressure exerted by said piston on water in said cylinder as said piston moves downwardly in said cylinder.

37. An irrigation sprinkler as set forth in claim 36 wherein said piston includes a spring biasing said piston toward said upper position within said cylinder.

38. An irrigation sprinkler as set forth in claim 37 wherein said lost motion piston and cylinder assembly includes a downwardly projecting stem attached to said valve head, and said piston includes a chamber into which said stem extends, said stem remaining stationary during an initial portion of the movement of said piston downwardly within said cylinder.

39. An irrigation sprinkler as set forth in claim 38 wherein a spring is disposed within said chamber and biases said stem and valve head toward the open position.

40. An irrigation sprinkler as set forth in claim 39 wherein said passageway extends centrally through said piston and said valve head.

41. An irrigation sprinkler as set forth in claim 40 wherein said first flow restricting device is disposed between said cylinder and the entrance to said passageway, and said second flow restricting device is disposed between said first flow restricting device and said bore of said riser.

42. An irrigation sprinkler as set forth in claim 41 wherein said second flow control device comprises a flow opening sized to limit the flow of water there through to a preselected rate.

* * * * *